United States Patent
Cho

[15] 3,668,724
[45] June 13, 1972

[54] HONEYCOMB FOUNDATION

[72] Inventor: Young T. Cho, 118-23 83rd Avenue, Kew Gardens, N.Y. 11451

[22] Filed: June 12, 1970

[21] Appl. No.: 45,791

[52] U.S. Cl. ............................................................ 6/11
[51] Int. Cl. ...................................................... A01k 47/04
[58] Field of Search ...................................... 6/11, 10, 2

[56] References Cited

UNITED STATES PATENTS

| | | |
|---|---|---|
| 2,276,938 | 3/1942 | Culbertson ................................. 6/10 |
| 2,779,037 | 1/1957 | Rouira Mari .............................. 6/11 |
| 2,331,231 | 10/1943 | Root et al. ................................. 6/11 |

OTHER PUBLICATIONS

The ABC and XYZ of Bee Culture by A. I. Root, published by the A. I. Root Co., Medina, Ohio pages 161, 162.

Primary Examiner—Lucie H. Laudenslager
Attorney—Auslander and Thomas

[57] ABSTRACT

A honeycomb foundation resists honeycomb stretch and in a honeycomb frame, the honeycomb foundation has a movable bottom which may be adjusted to induce bees to make honeycomb over the entire foundation area.

8 Claims, 9 Drawing Figures

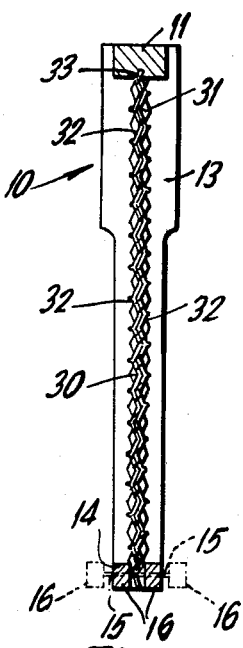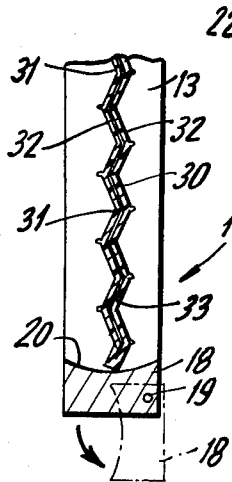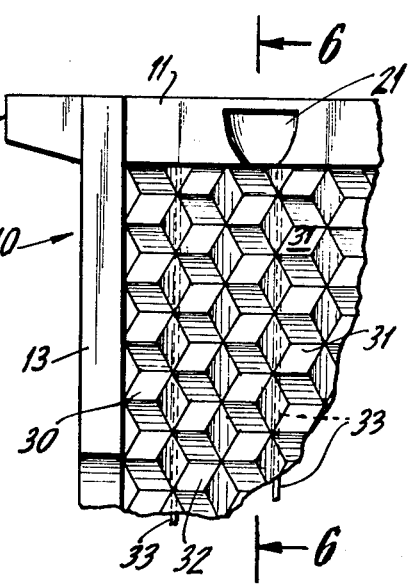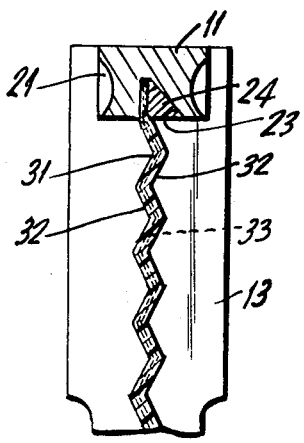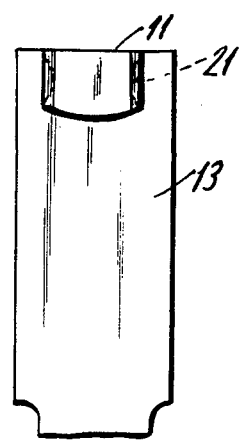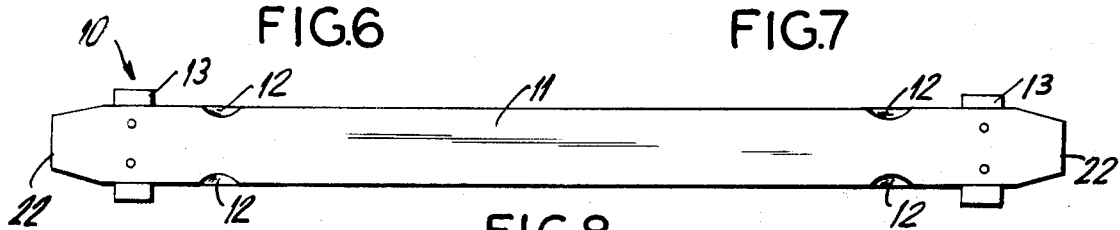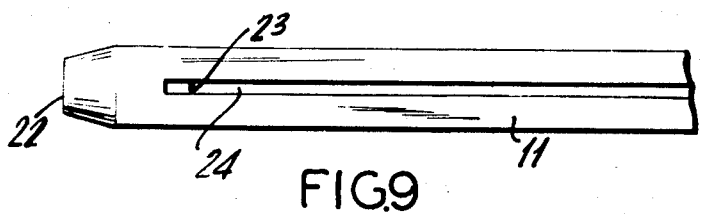

HONEYCOMB FOUNDATION

The present invention relates to a new improved honeycomb foundation and improved honeycomb frame and method.

In modern beekeeping, frames are provided for use in the hive into which honeycomb may be built and honey deposited.

Honeycomb foundation is preferably provided in the honeycomb frames so the bees will make their comb properly in the frame which may then be retrieved and the honey extracted.

The frames are generally removable from the hive. The honey is extracted from them by centrifugal rotation. Frames with existing honeycomb after the extraction of honey may be replaced in the hive where the bees will reuse the honeycomb for making more honey.

Honey production is slowed by the need for bees to produce beeswax for the making of honeycomb. Beeswax also consumes very much more nectar which could go into honey production.

Production in the frames is improved by maintaining the cells small so that they are the size for worker bees eggs and too small for drones.

The drones do not contribute to honey production and consume large amounts of honey. From the beekeeper's point of view, only a few drones to fertilize the queen are necessary.

Breakage of the honeycomb during the extraction process is costly to honey production because of the nectar and time it takes bees to rebuild the comb.

Honeycomb production of the past has provided a foundation for use in the frame having a basic cell size of that of the worker cells.

As a practical matter, honeycomb foundation must have support to maintain its size inside the hive. The natural heat inside the hive and the actual weight of the bees themselves tends to stretch the foundation, enlarging many of the cells to drone cell size and also causing the foundation to sag in the honeycomb frames. Sagging may buckle the honeycomb so that it is damaged as it overlaps the honeycomb in adjacent frames. Valuable bees are oftentimes killed, caught between comb and honeycomb frames in the handling of honeycomb frames for the ordinary purposes of beekeeping or for the purpose of honey removal for honey extraction.

The larger the percentage of the honeycomb frame that is covered with honeycomb, the greater and more efficient is the honey production.

Bees are very finicky in their idiosyncrasies and do not readily accept tampering with their natural environment.

The honeycomb frame itself is such tampering. The bees usually do not build honeycomb down to the bottom of the frame because of this. Thus, the honeycomb frame which does not have honeycomb down to the bottom may be weakly supported and subject to breakage of the honeycomb during centrifugal extraction.

The honeycomb foundation has been the subject matter of much effort to induce the bees to make only workers' cells.

Support wires have been implanted into the honeycomb foundation or string or cloth bases have been used in the honeycomb foundation to prevent the honeycomb foundation from stretching to prevent the making of drone cells and to prevent irregularities in the honeycomb, sagging or buckling.

The honeycomb foundation of the past has not fully succeeded. Wire supports lacking resilience and having a different response than the beeswax to heat and cold, have oftentimes separated from the foundation or promoted the breakage during the separation process.

The bees themselves oftentimes will attack wire supports to try and destroy them or the bees may not build honeycomb over the support area. Ambient outdoor temperature variations may produce different expansion and contraction variations in wire honeycomb frame support to aggravate the situation.

Fiber support in honeycomb foundation has not been entirely satisfactory either. Thread may not have sufficient strength to prevent sagging of the honeycomb foundation. The slightest fiber protrusion from the honeycomb foundation may lead the bees to attack the thread and destroy the thread, or not building honeycomb over the threaded area, all to the ultimate detriment of honey production. Any exposed thread or wire, especially at the bottom portion of honeycomb foundation is particularly vulnerable to attack or refusal of the bees to build honeycomb in those areas. Such exposed areas are also guide posts for the bees to follow in trying to remove the foreign matter.

According to the present invention, a new honeycomb foundation is provided, adapted for use in a new honeycomb frame which may both be used in a new beekeeping method to promote maximum honey production.

Although such novel feature or features believed to be characteristic of the invention are pointed out in the claims, the invention and the manner in which it may be carried out may be further understood by reference to the description following and the accompanying drawings.

FIG. 3 is a section of FIG. 1 at lines 3—3.

FIG. 4 is a section of FIG. 2 at lines 4—4.

FIG. 5 is a partial view of a honeycomb frame of the present invention and a top bar of the honeycomb frame of the present invention.

FIG. 6 is a section of FIG. 5 at lines 6—6.

FIG. 7 is an end view of the top bar of FIG. 5.

FIG. 8 is a plan view of a top bar of a frame of the present invention.

FIG. 9 is a partial bottom plan view of FIG. 8.

Referring now to the figures in greater detail, where like reference numbers denote like parts in the various figures.

Figure 1:
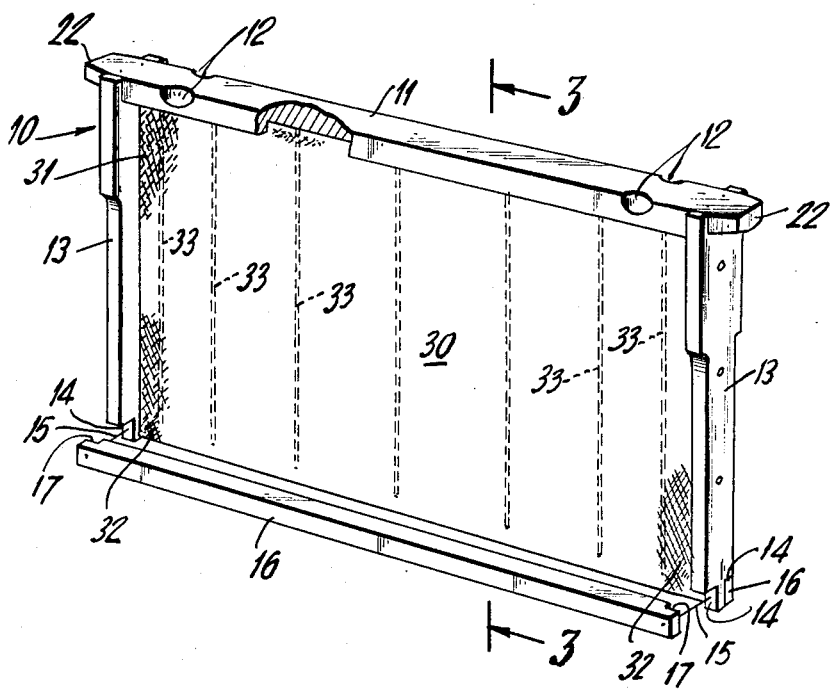
FIG. 1 is one embodiment of the honeycomb frame of the present invention with the honeycomb foundation of the present invention.

In FIG. 1 a honeycomb frame 10 is shown with a honeycomb foundation 30 of the present invention. The top bar 11 is provided with inset finger grips 12. The side bars 13 as seen in FIG. 1 have cut out portions 14 from which extend slide supports 15 which are attached to the bottom bars 16. The bottom bars 16 have notches 17 so that the bottom bars 16 may interfit with the side bars 13 and close on the slide supports 15 over the honeycomb foundation 30 substantially without protruding beyond the edges of the side bars 13.

Figure 2:
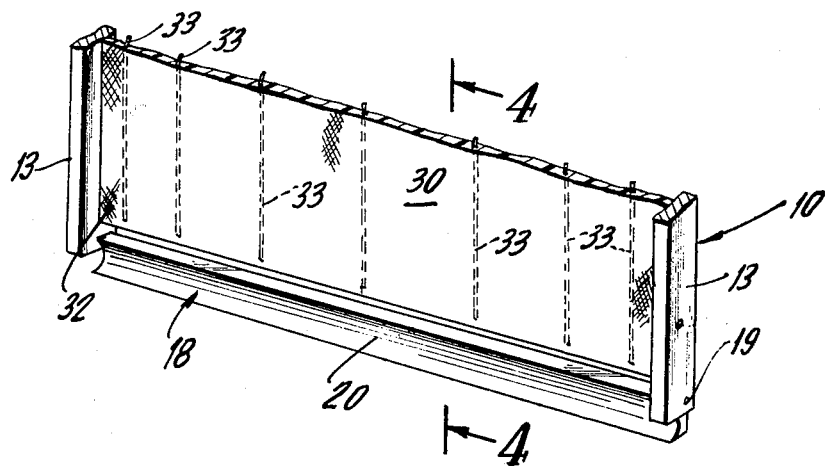
FIG. 2 is a partial view of another embodiment of the honeycomb frame of the present invention with the honeycomb foundation of the present invention.

In FIG. 2 a bottom bar 18 is pivotally mounted on nails 19 at one side of the side bar 13 so that the bottom bar 18 may be opened and swung away from the honeycomb foundation 30. The bottom bar 18 has a cut-out portion 20 which tends to cradle the honeycomb foundation 30 and actual honeycomb built on the honeycomb foundation when the bottom bar 18 is in closed position.

As shown in FIGS. 5 and 7, finger grips 21 are undercut into the top bar 11. The end portions 22 of the top bar 11 are bellied.

The honeycomb foundation 30 is held firmly in a slot 23, having a longitudinal wedge 24 which can be seen in FIGS. 6 and 9.

The honeycomb foundation 30 is regularly corrugated over its entire surface with small cells 31 substantially the size of worker bee cells. The outer surface 32 is generally of beeswax or beeswax mixed with mineral wax. Within the honeycomb foundation 30 is a series of monofilamentary thread supports 33.

The thread supports 33 extend from the top of the honeycomb foundation 30 where they may extend beyond the wax to the bottom of the honeycomb foundation 30 where they may not extend beyond the wax.

The supports 33 are plastic, preferably of nylon or some other similar strong plastic filament able to support the honeycomb foundation 30 and the weight of the honeycomb and bees encountered in hive conditions without substantial stretch. The thread supports 33 should have some resilience and ought not be affected by ambient temperature, much differently than the wax of the honeycomb foundation 30.

The honeycomb foundation 30 is mounted in the honeycomb frame 10 at the free edge from which the thread supports 33 extend, supported in the slot 23 by the wedge 24 which holds itself and the honeycomb foundation 30 firmly into top bar 11. As shown in FIGS. 1 and 3, the thread supports 33 extend through the honeycomb foundation 30 to a point between the bottom bars 16 without extending free of the honeycomb foundation 30. Thus, the bottom bars 16 may close over both the honeycomb foundation 30 and the enclosed thread supports 33 as shown in FIG. 3.

The honeycomb foundation 30 as shown in FIGS. 2 and 4 extends to a depth that places it within the cut-out portion 20 of the bottom bar 18 when in normal closed position. The thread supports 33 in this case preferably extend almost to the bottom of the honeycomb foundation 30 without being exposed.

The honeycomb frame 10 is often hard to remove from the hive because it is glued there by propolis put there by the bees. Removal of the honeycomb frame 10 of the present invention is facilitated by the finger grips 12 which, as shown in FIGS. 1 and 8, may be cut out of the top and side of the top bar 11 or as shown in FIGS. 5 and 6, may be cut under the top bar 11.

By grasping the finger grips 12 and rotating the top bar 11, the bellied portions of bar ends 22 quickly release the bar 11 from propolis on the frame of the hive (not shown) and allow the honeycomb frame 10 to be easily removed. There is a small surface area of the bar ends 22 that can be glued to the hive because of the bellying of the bar ends 22. The rotation of the bar 11, when held by the grip 12, facilitates the quick release of the bar 11 and the entire honeycomb frame 10.

It is preferable that the thread supports 33 be of a plastic such as a monofilament nylon. The monofilament has no fiber which is likely to protrude through the wax of the outer surface 32 of the honeycomb foundation 30. Bees discovering foreign substances tend to follow these through to their base and remove them. An ordinary thread would be easily found and cut by the bees destroying the support and leaving a hole in the honeycomb foundation 30 which would likely not contain honeycomb.

Even a multifilament thread of nylon presents a danger. If discovered, though the bees might not be able to bite the thread apart, they would tend to eat away the beeswax outer surface 32, following the undulation of the thread to try and destroy it, thus leaving a gap in the honeycomb.

Monofilament or not, the support thread 33 ought not protrude from the honeycomb foundation 30 to avoid being attacked, all to the detriment of the honeycomb and honeycomb production.

The natural abhorrence of bees to unnatural environment also applies to the honeycomb frame 10. The bottom bars 16, 18 are parts of an unnatural environment.

Where the honeycomb foundation 30 is free of the bottom bars 16, 18 when the honeycomb frame 10 is placed in the hive, the bees will start to build honeycomb on the cells 31. After work has progressed to a certain point, usually to about one third of the completion of the honeycomb by the bees. The bottom bars 16, 18 may then be closed. At this time, the bees will overcome their natural abhorrence to the foreign bar 16, 18 and continue to build honeycomb right down to the bottom bars 16, 18. Thus, there is no gap or space in the honeycomb frame 10 not filled with honeycomb and the honeycomb is supported by the bottom bars 16, 18.

The support threads 33 and bottom bars both aid in preventing the heat of the hive and weight of bees from stretching the cells 31, making them large enough for the queen bee to lay drone eggs in them. The drone is a double detriment to honey production. The drone does not work and also consumes honey.

The support of the bottom bars 16, 18 and support threads 35 further prevents sagging and buckling of the honeycomb, thus preventing destruction to bees and comb upon removal of the honeycomb frames 10. The honeycomb frames 10 are spaced so close together in the hive that almost any bulge presents some form of danger to bees, honeycomb or both.

In the centrifugal extraction of honey from the honeycomb frame 10, the bottom bars 16, 18 provided an important support against the loosening or breakage of the honeycomb. The resilience of the support threads 33 also allows them to flex with the honeycomb without straining against the honeycomb, causing breakage or cutting of the honeycomb, especially in colder weather when metal supports might tend to contract and change position within the formed honeycomb.

The amount of completion of making of honeycomb by the bees before the closing of the bottom bars 16, 18 varies. The bottom bars 16, 18 must be closed at some time after the start of the bees' work, to have them want to complete their work and before they have, by the heat of the hive and their weight, possibly caused the honeycomb foundation 30 to sag, buckle or stretch.

The bottom bar 18 does not actually have to touch the honeycomb or the honeycomb foundation 30 when it is closed. The cut-out portion 20 allows the honeycomb to be cradled in the bottom bar 18 which may act only as a secondary support against sagging and bulging or when honey is being extracted.

The terms and expressions which are employed are used as terms of description; it is recognized though, that various modifications are possible.

Having thus described certain forms of the invention in some detail, what is claimed is:

1. A honeycomb foundation adapted for use in a honeycomb frame comprising a thickness of wax having an outer surface corrugated in the shape of the base of worker bee cells, and a plurality of monofilamentary filamentary threads of strong resilient plastic completely embedded, unexposed in said wax when said foundation is in a honeycomb frame, said threads normally disposed in a vertical position when said foundation is in a honeycomb frame, said thread capable of supporting said foundation and comb and bees under normal hive conditions, no free portion of said threads normally exposed beyond said honeycomb foundation when said foundation is in a honeycomb frame.

2. The invention as claimed in claim 1 wherein said threads are nylon.

3. The invention as claimed in claim 1 wherein said threads are parallel to each other.

4. The invention as claimed in claim 1 wherein said threads extend beyond said wax along the upper edge of said foundation.

5. The invention as claimed in claim 4 wherein said wax extends a short distance beyond said thread along its lower edge.

6. The invention as claimed in claim 1 wherein said wax is beeswax.

7. The invention as claimed in claim 6 wherein said beeswax includes a mixture of other wax.

8. The invention of claim 1 wherein one edge of said honeycomb foundation including a plurality of monofilamentary threads is normally held by said honeycomb frame when said honeycomb foundation is in a honeycomb frame.

* * * * *